Oct. 6, 1970 JAMES E. WEBB 3,533,074

ADMINISTRATOR OF THE NATIONAL AERONAUTICS AND SPACE ADMINISTRATION

BINARY NUMBER SORTER

Filed Oct. 5, 1967

INVENTOR.

TAGE O. ANDERSON

BY

ATTORNEYS

United States Patent Office 3,533,074
Patented Oct. 6, 1970

3,533,074

BINARY NUMBER SORTER

James E. Webb, Administrator of the National Aeronautics and Space Administration, with respect to an invention of Tage O. Anderson, Arcadia, Calif.

Filed Oct. 5, 1967, Ser. No. 673,226
Int. Cl. G06f *7/00*
U.S. Cl. 340—172.5 9 Claims

ABSTRACT OF THE DISCLOSURE

Apparatus for sorting binary numbers to arrange them in order of magnitude. The apparatus is comprised of a mutiword recycling memory, a single word recycling input/output register, and logic and compare means. The outputs of the memory and input/output register are continually applied to the compare means. As long as the output words from the memory exceed in magnitude the word in the register, both the register and the memory continue to circulate. However, when the word in the register exceeds the output word from the memory, logical switching occurs to insert the register word into the memory and the memory word into the register.

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates generally to data processing apparatus and more particularly to a binary number sorting apparatus for arranging a plurality of words in order of magnitude.

Any general purpose computer is capable of sorting binary numbers utilizing well known sorting subroutines. In addition, some special purpose devices have been developed for sorting binary numbers. However, such devices have for the most part been unduly complex and therefore not well suited for spacecraft applications in which size and reliability are essential equipment characteristics.

OBJECTS AND SUMMARY OF THE INVENTION

One object of the present invention is to provide a relatively simple and highly reliable special purpose binary number sorting device.

An additional object of the invention is to provide a high speed, low cost binary number sorting device.

Briefly, in accordance with the invention, a single word input/output register and a multiword serial memory are circulated in synchronism. The outputs of the register and the memory are applied to a comparator which determines whether the register output word is larger than the memory output word. If it is, the memory output word is thereafter coupled to the register input and the register output word to the memory input.

Thus, each new word loaded into the register will be transferred into the proper position in the memory to maintain the words therein in order of magnitude.

A significant feature of the invention constitutes its ability to output data at a slow rate to match the state of electromechanical devices, such as line printers. The apparatus can be switched from the high speed sort mode to the low speed output mode merely by changing the criteria of the comparator so that the memory output words are loaded into the register only when they exceed the register output word. In this manner, N memory words can be read out in N full memory cycles, each word being held in the register for one full cycle.

DESCRIPTION OF THE PREFERRED EMBODIMENTS

Figure 1:
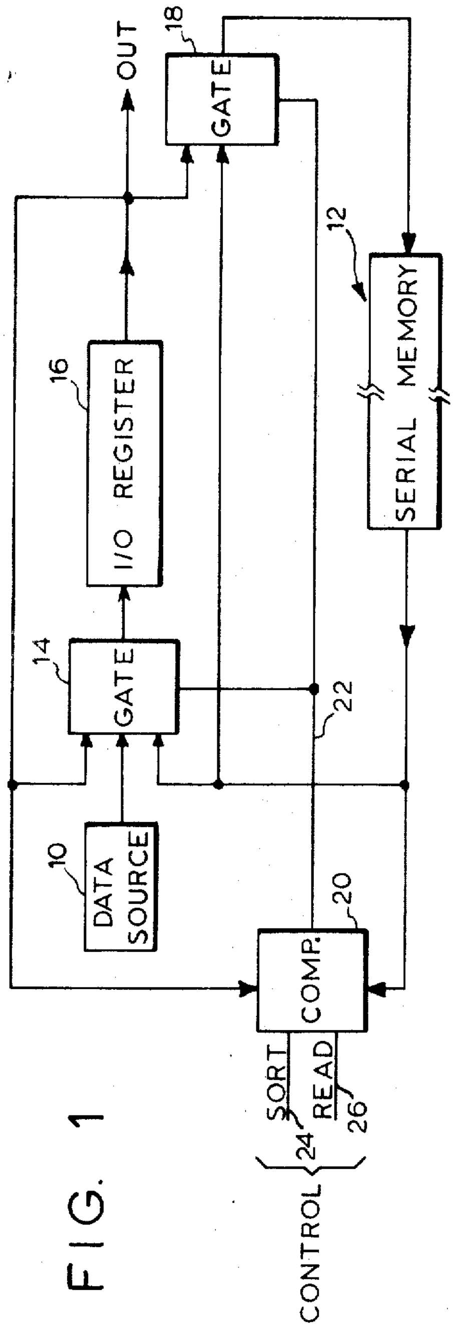
FIG. 1 is a block diagram of an embodiment of the invention.

Attention is now called to FIG. 1 which illustrates a block diagram of an apparatus in accordance with the invention for sorting binary numbers. More particularly, the apparatus of FIG. 1 functions to insert a binary word provided by data source 10 into its proper position, by magnitude, in the serial memory 12. The serial memory 12 can constitute any one of numerous devices such as a magnetic drum, an endless magnetic tape belt, a delay line, or any one of numerous other devices.

The output of the data source 10 is connected through a gate 14 to the input of a single word input/output register 16. The output of the register 16 is connected to the input of a gate 18 whose output is connected to the input of the serial memory 12. The outputs of both the register 16 and serial memory 12 are connected to the inputs of gate 14 and in addition are connected to the inputs of gate 18.

Further, the outputs of register 16 and serial memory 12 are connected to the inputs of a comparator 20 whose output line 22 controls both gates 14 and 18.

In the operation of the apparatus of FIG. 1, assume that the serial memory 12 contains several words arranged in order of decreasing magnitude so that the largest word stored in the memory is output first during each memory cycle. Prior to each memory cycle, a word to be inserted in its proper position in the memory 12 is delivered by the source 10 through gate 14 to the register 16. During the memory cycle, each word output by the serial memory is compared with the word in the register 16 by the comparator 20. So long as the word provided by the memory 12 exceeds the word stored in register 16, the gates 14 and 18 will be controlled to respectively recycle the contents of register 16 and memory 12. On the other hand, when the comparator 20 recognizes that the word in register 16 exceeds in magnitude a word output from memory 12, it will switch the gates 14 and 18 to thus couple the output of memory 12 to the input of register 16 and the output of register 16 to the input of memory 12. Accordingly, the word in the register 16 will be inserted into its proper position in the memory 12 and all of the succeeding words in the memory 12 will be passed through the register 16 prior to returning to memory 12, thereby being shifted one word time backward in the memory 12.

In accordance with a significant feature of the invention, the comparator 20 is provided with first and second control terminals 24 and 26. In order to define the sort mode, a logically true signal is applied to comparator control terminal 24. On the other hand, in order to cause the words in memory 12 to be read out at a comparatively slow speed on the output terminal of register 16, a logically true signal is applied to comparator control terminal 26. In the output mode, the criteria applied to the comparator is reversed as will be better seen hereinafter, so that the output of the memory 12 is coupled to the input of the register 16 when the memory output word exceeds the register output word. Thus, if the words in the memory 12 are arranged in order of decreasing magnitude, each word will remain stored in the register 16 for a full memory cycle thus enabling it to be easily coupled to slower speed peripheral devices such as the electromechanical line printers.

Figure 2:
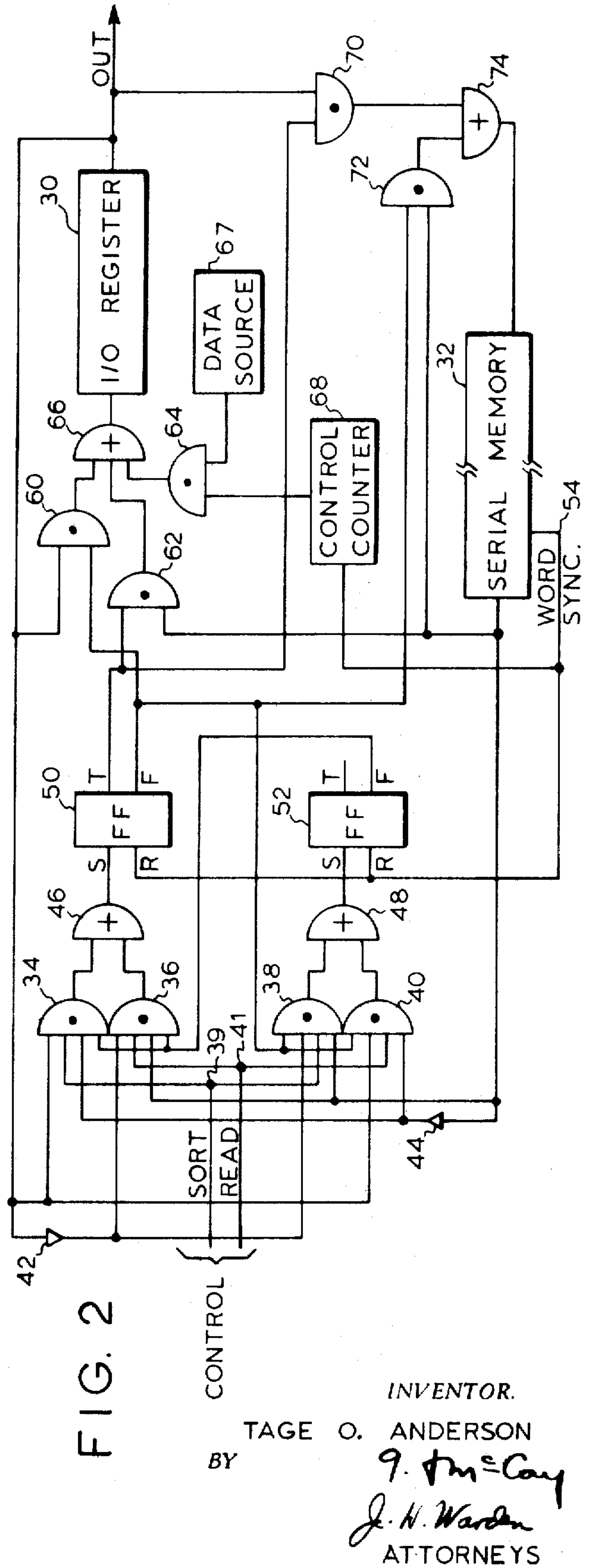
FIG. 2 is a block logic diagram of an embodiment of the invention.

Attention is now called to FIG. 2 which illustrates the apparatus of FIG. 1 in greater detail. As in FIG. 1, an input/output register and a serial memory respectively designated 30 and 32 are provided.

The comparator 20 of FIG. 1 is comprised of AND gates 34, 36, 38, and 40 in FIG. 2. Gates 34 and 38 are enabled during the sort mode of operation when a true logic signal is applied to control terminal 39. Gates 36 and 40 are active during the read or output mode when a true logic signal is applied to control terminal 41. The gates function to determine whether a word being output from the memory 32 is greater or less than the word being output from the register 30. In order to do this, the output of register 30 is connected directly to the inputs of gates 34 and 40 and through inverter 42 to the inputs of gates 36 and 38. The output of memory 32 on the other hand is connected directly to the inputs to gates 36 and 38 and through inverter 44 to the inputs of gates 34 and 40. Thus, if the register and memory respectively provide "1" and "0" outputs, gates 34 and 40 will be permitted to be enabled. If on the other hand, the bit output from memory 32 is "1" and the bit output from register 30 is "0," gates 36 and 38 will be permitted to be enabled.

The outputs of gates 34 and 36 are connected to the input of an OR gate 46. The outputs of gates 38 and 40 are similarly connected to the input of an OR gate 48. The outputs of gates 46 and 48 are respectively connected to the set input terminals of flip-flops 50 and 52. The false output terminal of flip-flop 50 is connected to the input of gates 38 and 40 so that when flip-flop 50 is set, gates 38 and 40 are inhibited. Similarly, the false output terminal of flip-flop 52 is connected to the inputs of gates 34 and 36 so that when flip-flop 52 is set, gates 34 and 36 are inhibited.

The serial memory 32 provides a word sync pulse on line 54 immediately prior to providing the initial bit of each word on the memory output line. The word sync pulse line 54 is connected to the reset input terminals of 50 and 52. Thus, at the very beginning of each word time or word period, the flip-flops 50 and 52 are reset. One of the flip-flops 50 or 52 will thereafter be set as soon as the output bits provided by the register 30 and memory 32 differ. Assuming that the bits appear on the register and memory output lines from most to least significant, the initial differing bits determine whether the register word or memory word is greater. For example, if the first bits that differ during a word time involve a "1" bit provided by the register 30 and a "0" bit provided by the memory 32, it is apparent that the register word is larger and thus gate 34 will be enabled to set flip-flop 50. This action inhibits gates 38 and 40 thus preventing flip-flop 52 from being set until the next word sync pulse is generated at the beginning of a subsequent word time.

The outputs of the flip-flops 50 and 52 control the gating means 14 and 18 shown in FIG. 1. More particularly, the gating means 14 is comprised of AND gates 60, 62, and 64. The outputs of AND gates 60, 62, and 64 are connected to the input of OR gate 66 whose output is connected to the input of register 30.

The false output terminal of flip-flop 50 and the output of register 30 are connected to the input of AND gate 60. The true output terminal of flip-flop 50 and the output of memory 32 are connected to the input of gate 62. The output of data source 67 is connected to the input of gate 64 along with the carry output of a control counter 68. The control counter 68 is sequenced in response to the word sync pulses provided by the memory 32. Thus, the control counter 68 provides one carry pulse for each memory cycle and it is only at this time that the data source 67 can load a new word into the register 30.

The gate means 18 of FIG. 1 is comprised of AND gates 70 and 72 whose outputs are connected to the input of an OR gate 74. The output of OR gate 74 is connected to the input of the serial memory 32.

The false output terminal of flip-flop 50 is connected to the input of AND gate 72 along with the output of memory 32. The true output terminal of flip-flop 50 is connected to the input of AND gate 70 along with the output of register 30.

In the operation of the apparatus of FIG. 2, initially assume that a sort mode is defined by the application of a true logic signal to the sort control terminal 39 and a false logic signal to the read control terminal 41. This permits one of gates 34 and 38 to be enabled. Flip-flops 50 and 52 are reset, as previously mentioned, at the beginning of each word time. The output bits subsequently provided by the register 30 and memory 32 are then applied to the gates 34 and 38. As long as the bits provided by the register 30 and memory 32 are identical, neither gate 34 nor gate 38 will be enabled. Thus, flip-flops 50 and 52 will both remain reset and the outputs of register 30 and memory 32 will be returned to their inputs through gates 70 and 72 respectively. However, when the bits provided by the register and memory differ, either gate 34 or gate 38 will be enabled. As previously pointed out, gate 34 will be enabled if the register bit exceeds the memory bit and gate 38 will be enabled if the memory bit exceeds the register bit. Thus, flip-flop 50 will be set if the register word exceeds the memory word and flip-flop 52 will be set if the memory word exceeds the register word. If flip-flop 50 is set, gate 38 will be thereafter inhibited and likewise, if gate 52 is set, gate 34 will be thereafter inhibited.

If flip-flop 50 is set, gates 62 and 70 will be enabled to thus couple the output of memory 32 to the input of register 30 and the output of register 30 to the input of memory 32.

On the other hand, if flip-flop 52 had been set, then gates 60 and 72 would remain enabled to cause the register 30 and memory 32 to continue to cycle.

Accordingly, it will be appreciated that if the word in register 30 exceeds a word output from the memory 32, the word in register 30 will replace that word in memory 32 and the displaced word from the memory will be loaded into the register 30. During the next word time, the displaced word in register 30 should in turn displace the next word from memory 32, assuming that the words in memory 32 were initially arranged in order of magnitude. It will thus be appreciated that at the end of a memory cycle, the word from register 30 will have been inserted into the memory 32 in its proper position and the words following that position will have been moved backward one position in the memory.

The control counter 68 is responsive to the word sync pulses provided by the memory 32. Thus, the control counter 68 will be able to provide a carry output pulse after N word times or at the end of each memory cycle to enable gate 64 in order to transfer a new word from the data source 67 into the register 30.

When it is desired to unload the words in the serial memory 32 to a slower speed device such as an electromechanical line printer for example, a true logic signal is provided to the out control terminal 41 and a false logic signal is applied to the sort control terminal 39. The effect of providing a true signal to control terminal 41 is to reverse the comparison criteria. That is, whereas in the sort mode, the output of memory 32 was coupled to the input of register 30 when the register word exceeded the memory word, in the output mode, the output of memory 32 is coupled to the input of register 30 when the memory word exceeds the register word. Assuming that the memory words have been arranged in order of decreasing magnitude, it should thus be apparent that the largest word in the memory will be loaded into the register 30 and will remain there for a full memory cycle inasmuch as all of the succeeding words in the memory will be of smaller magnitude. Thus, the word in the register 30 is available for a full memory cycle and a slower speed device can therefore be easily operated therefrom. Similarly, all succeeding words will remain in the register 30 for one full memory cycle.

From the foregoing, it should be appreciated that a simple, highly reliable, and low cost special purpose binary number sorter has been disclosed herein for arranging binary numbers in order of magnitude by comparing each new number with each of a plurality of numbers stored in memory and by inserting the new number after the first number that it exceeds. This action will have the effect of shifting all subsequent numbers in the memory backwards one position to accommodate the newly inserted number. It should further be appreciated that means have been provided in the sorter for modifying the criteria used by the comparing means to read out numbers from the memory at a rate compatible with relatively slow speed electromechanical devices.

Although particular embodiments of the invention have been described and illustrated herein, it is recognized that modifications and variations may readily occur to those skilled in the art and consequently it is intended that the claims be interpreted as covering such modifications and variations.

What is claimed is:

1. A binary number sorting apparatus comprising:

a register for storing a single multibit word;

a memory for storing a plurality of multibit words;

said register and memory each having an input terminal and an output terminal;

means for serially providing the bits stored in said register at said register output terminal;

means for serially providing the bits stored in said memory at said memory output terminal;

a first gating means coupling said register output terminal to said register input terminal and said memory output terminal to said memory input terminal;

a second gating means coupling said register output terminal to said memory input terminal and said memory output terminal to said register input terminal; and comparing means coupled to said register and memory output terminals for controlling said first and second gating means.

2. The apparatus of claim 1 including timing means defining successive word periods; and logic means coupled to said comparing means and responsive to said timing means for causing said comparing means to control said gating means during each word period only in response to the first pair of bits provided at said register and memory output terminals which differ.

3. The apparatus of claim 1 wherein said comparing means includes means for selectively defining first and second modes for respectively enabling said second gating means in response to different first and second bit patterns provided thereto.

4. Sorting apparatus for entering a new binary number into its proper position by magnitude in an ordered arrangement of a plurality of binary numbers, said apparatus comprising:

a memory for storing a plurality of multibit numbers in order of magnitude, said memory having an input terminal and an output terminal;

a register for storing a single multibit number to be entered into said memory in its proper position in said order, said register having an input terminal and an output terminal;

means for providing the numbers stored in said memory at the output terminal thereof in sequence;

means for comparing the magnitude of the numbers stored in said register with each output numbers provided by said memory; and gating means responsive to said comparing means for either coupling the output terminals of the memory and register to the input terminals of said memory and register respectively or the output terminal of said memory to the input terminal of said register and the output terminal of said register to the input terminal of said memory.

5. The apparatus of claim 4 including means for shifting the bits sorted in said memory and register between the input and output terminals thereof in synchronism.

6. The apparatus of claim 5 including timing means defining successive time periods; and logic means coupled to said comparing means and responsive to said timing means for determining the initial non-matching bits provided on said output terminals during each of said time periods.

7. The apparatus of claim 6 wherein said gating means is responsive to the bit, of said initial non-matching bits, provided on said register output terminal being greater for coupling said memory output terminal to said register input terminal and said register output terminal to said memory input terminal.

8. The apparatus of claim 6 wherein said comparing means includes means for selectively defining first and second modes;

said gating means being responsive to said first mode being defined and the bit of said initial non-matching bits provided on said register output terminal being greater for coupling said memory output terminal to said register input terminal and said register output terminal to said memory input terminal.

9. The apparatus of claim 6 wherein said comparing means includes means for selectively defining first and second modes;

said gating means being responsive to said first mode being defined and the bit of said initial non-matching bits provided on said memory output terminal being greater for coupling said memory output terminal to said register input terminal and said register output terminal to said memory input terminal.

References Cited

UNITED STATES PATENTS

| | | | |
|---|---|---|---|
| 2,798,216 | 7/1957 | Goldberg et al. | 340—172.5 XR |
| 3,329,939 | 7/1967 | Armstrong | 340—172.5 |
| 3,336,580 | 8/1967 | Armstrong | 340—172.5 |
| 3,399,383 | 8/1968 | Armstrong | 340—172.5 |
| 3,411,146 | 11/1968 | Knutson | 340—172.5 |
| 3,444,523 | 5/1969 | Dirks | 340—172.5 |

RAULFE B. ZACHE, Primary Examiner